United States Patent
Dawe et al.

(10) Patent No.: US 8,523,259 B2
(45) Date of Patent: Sep. 3, 2013

(54) TOOL MOUNTING ASSEMBLY FOR MOTOR VEHICLES

(75) Inventors: Brandon Dawe, Livonia, MI (US); Ryan Corby, Grass Lake, MI (US)

(73) Assignee: Nissan North America, Inc., Franklin, TN (US)

(*) Notice: Subject to any disclaimer, the term of this patent is extended or adjusted under 35 U.S.C. 154(b) by 420 days.

(21) Appl. No.: 13/042,853

(22) Filed: Mar. 8, 2011

(65) Prior Publication Data

US 2012/0228352 A1 Sep. 13, 2012

(51) Int. Cl.
*B60R 11/06* (2006.01)

(52) U.S. Cl.
USPC ........................................... 296/37.8

(58) Field of Classification Search
USPC ................. 296/37.1, 37.8; 224/547
See application file for complete search history.

(56) References Cited

U.S. PATENT DOCUMENTS

| | | | |
|---|---|---|---|
| 1,008,680 A | 11/1911 | Temple | |
| 1,837,657 A | 12/1931 | Fedderman | |
| 3,513,969 A | 5/1970 | Roff | |
| 3,873,010 A * | 3/1975 | Patterson | 224/275 |
| 3,964,612 A * | 6/1976 | Skilliter et al. | 211/26 |
| 4,995,537 A * | 2/1991 | Thedieck | 224/547 |
| 5,102,020 A * | 4/1992 | Walker et al. | 224/29.5 |
| 5,104,170 A | 4/1992 | Rich | |
| 5,738,260 A | 4/1998 | Kirtland | |
| 6,230,949 B1 | 5/2001 | O'Connell et al. | |
| 6,530,510 B2 * | 3/2003 | Ferrari | 224/547 |
| 6,863,198 B1 * | 3/2005 | Darby | 224/403 |
| 7,562,924 B2 | 7/2009 | Schultz et al. | |
| 7,708,175 B2 | 5/2010 | Edwards | |
| 2012/0228352 A1 * | 9/2012 | Dawe et al. | 224/547 |

FOREIGN PATENT DOCUMENTS

| | | |
|---|---|---|
| JP | 2001146137 | 5/2001 |
| WO | 03101799 | 12/2003 |

OTHER PUBLICATIONS

2011 Chevrolet Express Owner's Manual Excerpt.
2009 Dodge Sprinter Owner's Manual Excerpt.
2011 Ford Econoline Owner's Guide Excerpt.
Package Deals!—Ultimate Bike Pack, http://www.macscustomtiedowns.com/product/254/PackageDeals, Publication Date Unknown, Retrieved on Mar. 4, 2011.
Camping Accessories, Towing and Security Chassis, Levelling Aids, Wheel Chock Bag, http://www.caravan-parts-accessories.co.uk/products/towing-and-security-chassis/levelling-aids/wheel-chock-bag, Publication Date Unknown, Retrieved on Mar. 4, 2011.

(Continued)

*Primary Examiner* — H Gutman
(74) *Attorney, Agent, or Firm* — Young, Basile, Hanlon & MacFarlane, P.C.

(57) ABSTRACT

A tool mounting assembly for a motor vehicle includes a vehicle body structure, a first storage container portion that is configured to receive at least one jack operation tool, and a second storage container portion that is fixed to the first storage container portion and is configured to receive at least one wheel chock. A first bracket is attached to the vehicle body structure and fully surrounds the first storage container portion in a direction that is substantially perpendicular to a longitudinal direction of the first storage container portion. A second bracket is attached to the vehicle body structure and at least partially surrounds the first storage container portion. The second storage container portion is positioned between the first bracket and the second bracket.

20 Claims, 4 Drawing Sheets

(56) References Cited

OTHER PUBLICATIONS

Automobile Emergency Bag, http://cosconline.com/showprod.php-?productid=7896, Publication Date Unknown, Retrieved on Mar. 4, 2011.

LeatherZ: Extended Tool Kit, http://www.leatherz.com/Merchant5/merchant.mvc?Screen=PROD&Store_Code=01&Product_Code=ToolKit&Category_Code=SafetyConvenience, Publication Date Unknown, Retrieved on Mar. 4, 2011.

OEM Jack, Wheel Chock and Storage Bag with Hooks for Bonnet—North America Motoring :: Marketplace, http://www.northamericanmotoring.com/marketplace/showproduct.php/product/15681/cat/22, Publication Date Unknown, Retrieved on Mar. 4, 2011.

* cited by examiner

TOOL MOUNTING ASSEMBLY FOR MOTOR VEHICLES

TECHNICAL FIELD

The disclosure relates to the field of storage within motor vehicles, and more particularly, to tool mounting assemblies for motor vehicles.

BACKGROUND

Motor vehicles are typically provided with a spare tire and tools for changing a tire in the event that one of the tires of the vehicle requires replacement. These tools often include a jack, a jack handle, and a wrench. The tools may further include a hoist handle that is used to operate a tire hoist that stores a spare tire underneath the body of the vehicle, as commonly found on trucks and vans.

During design of a vehicle, a location must be provided for storing the tools. In cars having a trunk, the tire is typically stored in a well that is defined beneath a removable panel in the trunk, and the tools are often stored in that area as well.

In certain trucks, sport utility vehicles, and vans, it is necessary to store the tools within the passenger compartment or within an area that is contiguous with the passenger compartment. Thus, the tools must be stored in a secure manner, such that they do not become dislodged in the case of an abrupt change in acceleration. Also, the tools should be mounted such that they may be easily removed when they are needed. Finally, to the extent that the tools are exposed to the passenger compartment, aesthetic considerations dictate that the manner of storage be attractive, so as not to detract from the aesthetics of the passenger compartment of the vehicle.

SUMMARY

Tool mounting assemblies for motor vehicles are taught herein.

One tool mounting assembly includes a vehicle body structure, a first storage container portion that is configured to receive at least one jack operation tool, and a second storage container portion that is fixed to the first storage container portion and is configured to receive at least one wheel chock. A first bracket is attached to the vehicle body structure and fully surrounds the first storage container portion in a direction that is substantially perpendicular to a longitudinal direction of the first storage container portion. A second bracket is attached to the vehicle body structure and at least partially surrounds the first storage container portion. The second storage container portion is positioned between the first bracket and the second bracket.

Another tool mounting assembly includes a vehicle body structure, a first storage bag, a second storage bag, an upper bracket and a lower bracket.

The first storage bag is configured to receive at least one jack operation tool. The second storage bag is fixed to the first storage bag and is configured to receive a first wheel chock and a second wheel chock. The first storage bag extends from a first end to a second end in a longitudinal direction, and the second storage bag is fixed to the first storage bag such that it is spaced apart from both the first end and the second end of the first storage bag.

An upper bracket is attached to the vehicle body structure and at least partially surrounds the first storage bag. A circumference of the upper bracket corresponds to a circumference of the first storage bag. A lower bracket is attached to the vehicle body structure and at least partially surrounds the first storage bag. A circumference of the lower bracket corresponds to the circumference of the second first storage bag. The second storage bag is positioned between the upper bracket and the lower bracket.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
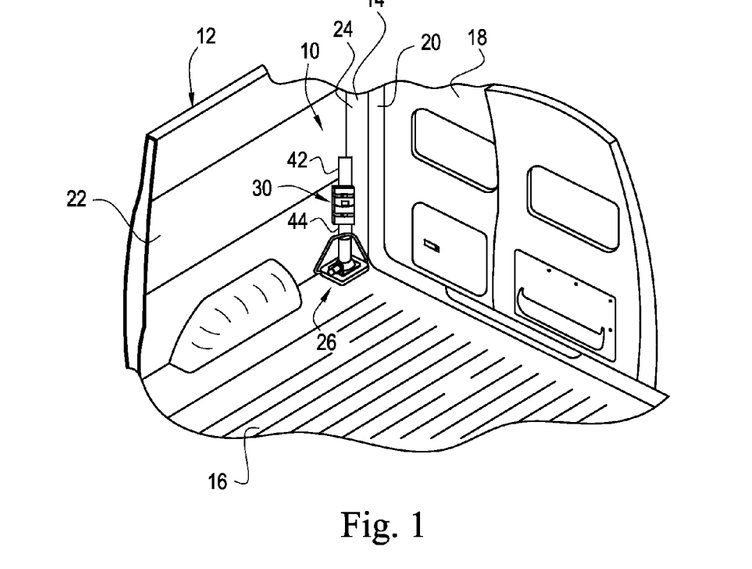
FIG. 1 is a perspective view of an interior of a motor vehicle showing a tool mounting assembly that is disposed within the motor vehicle.

FIG. 1 shows a tool mounting assembly 10 for a motor vehicle. The tool mounting assembly 10 includes a vehicle body structure 12 of the motor vehicle, a storage container 30, an upper bracket 42, and a lower bracket 44.

The vehicle body structure 12 includes a structural pillar of the motor vehicle, such as a rearmost structural pillar 14 (e.g., a D-pillar) of the motor vehicle. The rearmost structural pillar 14 is generally upright, and extends upward from a floor 16 of the motor vehicle, and is located at a rear corner of the vehicle where a rear door 18 and a side wall 22 meet. The rearmost structural pillar 14 provides structural support to the side wall 22 and the rear door 18.

The rear door 18 is hingedly connected to a first side 20 of the rearmost structural pillar 14 for pivotal motion of the rear door 18 with respect to the rearmost structural pillar 14. The side wall 22 is connected to the rearmost structural pillar 14 at a second side 24 thereof, opposite the first side 20. When the rear door 18 is in a closed position, the rear door 18 and the side wall 22 could extend substantially perpendicular to one another.

A jack 26 is disposed adjacent to the rearmost structural pillar 14 of the motor vehicle and is supported by the floor 16 of the motor vehicle. The jack 26 may also be adjacent to the side wall 22 of the motor vehicle. The jack 26 could be any conventional type of jack for partially lifting vehicles, such as a conventional bottle jack. The jack 26 could include retaining structures 28 that support and secure the jack 26 with respect to the floor 16 of the motor vehicle.

Figure 2:
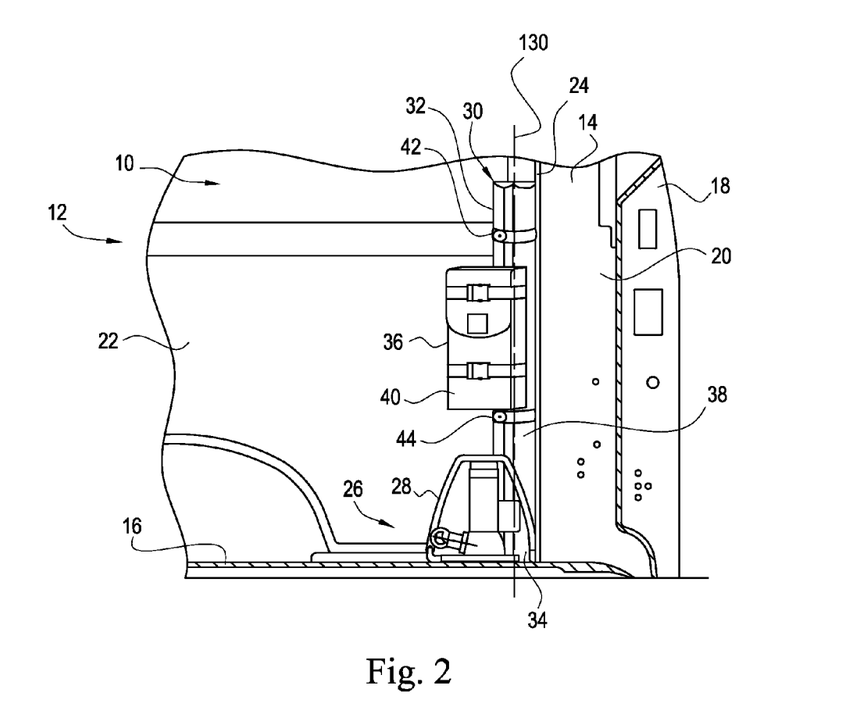
FIG. 2 is a side view showing the tool mounting assembly.

The storage container 30 is configured to receive one or more tools (not shown in FIGS. 1-2). The storage container 30 has an upper portion 32, a lower portion 34, and a central portion 36. The central portion 36 of the storage container 30 could have a circumference that is greater than the circumference of the upper portion 32 as well as the lower portion 34. As will be explained further herein, the storage container 30 could be defined by first and second storage container portions, such as a first storage bag 38 and a second storage bag 40 that is fixed to the first storage bag 38. The upper portion 32 and the lower portion 34 of the storage container 30 are each defined solely by the first storage bag 38. The central portion 36 of the storage container 30 is defined by the first storage bag 38 and the second storage bag 40 in combination.

The upper bracket 42 is attached to the vehicle body structure 12 and at least partially surrounds the upper portion 32 of the storage container 30. The lower bracket 44 is spaced from the upper bracket. For example, the lower bracket 44 could be spaced from the upper bracket 42 vertically along the rearmost structural pillar 14 of the motor vehicle. The lower bracket 44 is attached to the vehicle body structure 12 and at least partially surrounds the lower portion 34 of the storage container 30. Thus, the upper bracket 42 and the lower bracket 44 each at least partially surround the first storage bag 38, and the second storage bag 40 is positioned between the upper bracket 42 and the lower bracket 44.

The upper bracket 42 has a circumference that corresponds to the circumference of the upper portion 32 of the storage container 30, and the lower bracket 44 has a circumference that corresponds to the circumference of the lower portion 34 of the storage container 30. A circumference of the second storage bag 40 is larger than the circumference of each of the upper bracket 42 and the lower bracket 44.

The upper bracket 42 and the lower bracket 44 are positioned with respect to the vehicle body structure 12, such as the rearmost structural pillar 14, such that the storage container 30 is secured by the upper bracket 42 and the lower bracket 44 in a generally upright orientation. The upper and lower brackets 42, 44 could be configured to secure the storage container 30 in a substantially vertical orientation. The upper and lower brackets 42, 44 could be aligned along a bracket axis 130 that is generally upright or substantially vertical.

The upper bracket 42 and the lower bracket 44 could be positioned with respect to the rearmost structural pillar 14 of the motor vehicle such that the lower portion 34 of the storage container 30 contacts the floor 16 of the motor vehicle, and is disposed adjacent to the jack 26. For example, the lower portion of the storage container 30 could be positioned between the jack 26 and the rearmost structural pillar 14 of the motor vehicle. The central portion 36 of the storage container 30 is positioned directly above and at least partially overhangs the jack 26, such that the jack 26 is at least partially disposed between the central portion 36 of the storage container 30 and the floor 16 of the motor vehicle.

Figure 3:
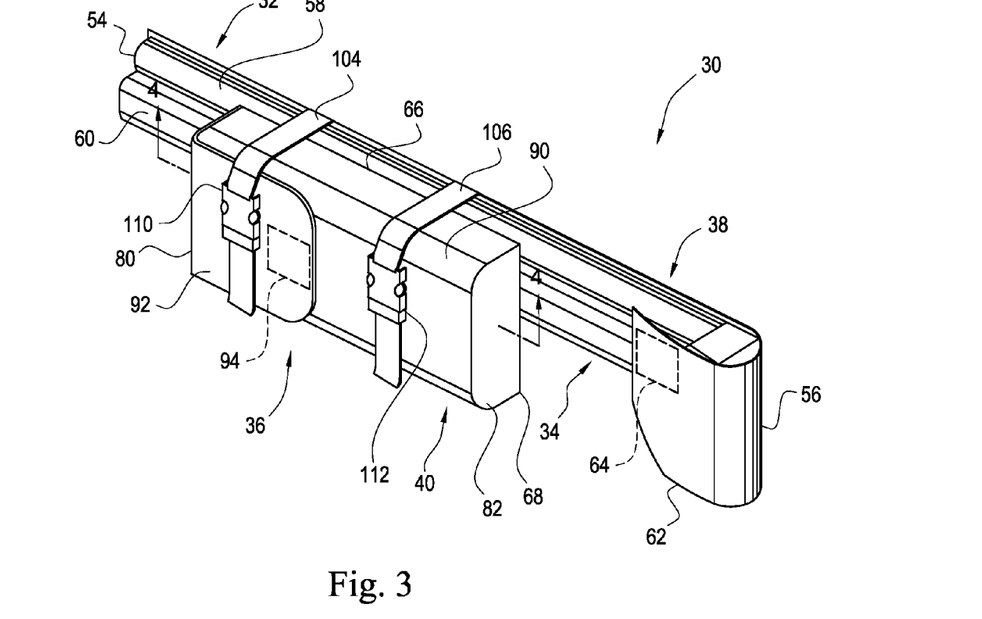
FIG. 3 is a perspective view showing a storage container of the tool mounting assembly.
Figure 4:
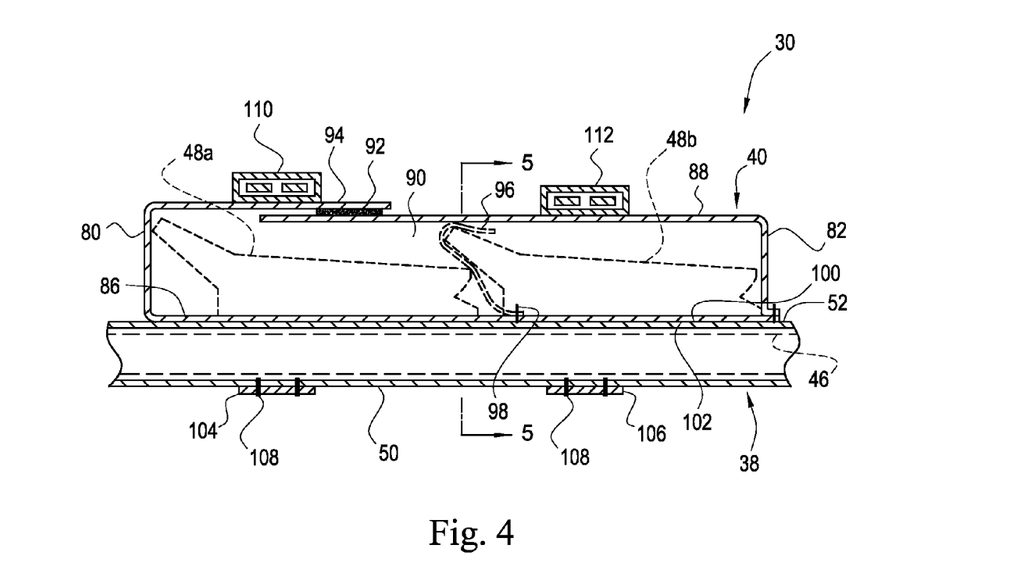
FIG. 4 is a side cross-section view of the storage container.
Figure 5:
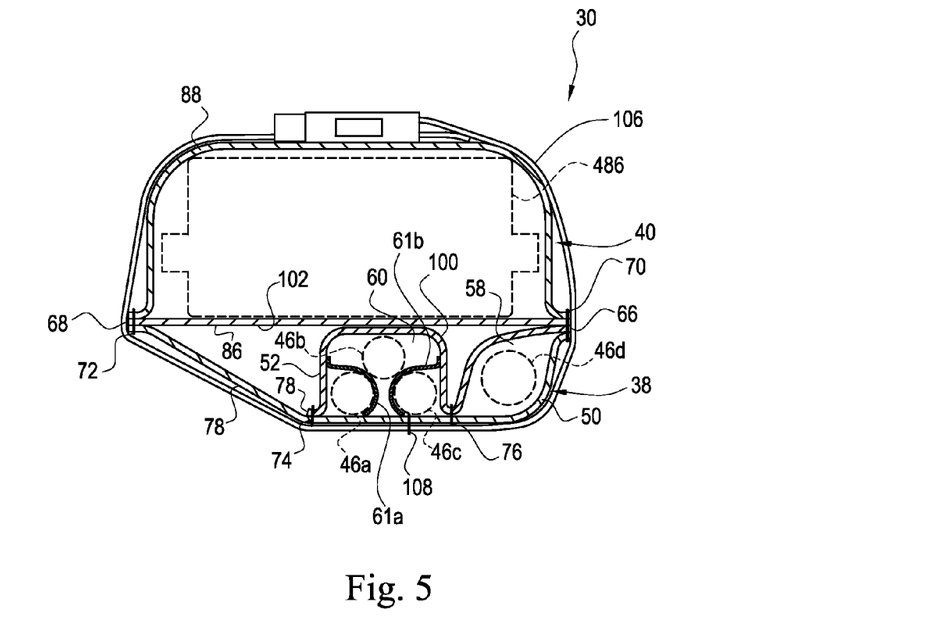
FIG. 5 is an end cross-section view of the storage container.

As shown in FIGS. 3-5, the storage container 30 includes the first storage bag 38 and the second storage bag 40. The first storage bag 38 is connected to the second storage bag 40. The first storage bag 38 could be permanently affixed to the second storage bag 40. For example, the first storage bag 38 and the second storage bag 40 could be sewn together.

The first storage bag 38 and the second storage bag 40 are each fabricated from a flexible material. For example, the first storage bag 38 and the second storage bag 40 could be fabricated from fabric materials, either natural or synthetic. As another example, the first storage bag 38 and the second storage bag 40 could be fabricated from plastic or rubber materials. In this case the first storage bag 38 and the second storage bag could be integrally formed. These examples are not necessarily limiting, and other materials could be utilized.

The first storage bag 38 is configured to receive at least one jack operation tool 46A-46D. The second storage bag 40 is configured to receive at least one wheel chock, such as a first wheel chock 48A and a second wheel chock 48B. The first storage bag 38 and the second storage bag 40 are configured to prevent the at least one jack operation tool 46A-46D and the wheel chocks 48A-48B from contacting one another.

The first storage bag 48 extends from a first end 54 to a second end 56. The first end 54 of the first storage bag 38 is located on the upper portion 32 of the storage container 30. The second end 56 of the first storage bag 38 is located on the lower portion 34 of the storage container 30. The first storage bag 38 defines a first compartment 58 and a second compartment 60.

The first compartment 58 and the second compartment 60 of the first storage bag 38 have open ends that are disposed at the second end 56. The first storage bag 38 includes a flap 62 that is moveable between open and closed positions. The flap 62 is adjacent to the open ends of the first compartment 58 and the second compartment 60. The first storage bag 38 includes a hook-and-loop fastener 64 that is operable to secure the flap 62 in the closed position.

The first storage bag 38 could be defined by a plurality of panels, such as a first panel 50 and a second panel 52. The first panel 50 and the second panel 52 are sewn together to define the first compartment 58 and the second compartment 60. The second compartment 60 could also be further subdivided into additional compartments using additional panels 61A and 61B in order to prevent jack operation tools 46A-46C from contacting one another.

The first storage bag 38 is attached to the second storage bag 40 at a first lateral edge 66 and a second lateral edge 68 of the storage container 30. For example, the first storage bag 38 could be connected to the second storage bag 40 by a first seam 70 that is positioned adjacent to the first lateral edge 66 of the storage container 30 and by a second seam 72 that is positioned adjacent to the second lateral edge 68 of the storage container 30. The first seam 70 and the second seam 72 extend along a longitudinal direction of the storage container 30, and extend from the first end 54 of the first storage bag 38 to a second end 56 of the first storage bag 38.

The first panel 50 and the second panel 52 of the first storage bag 38 are connected to one another by the first seam 70, a third seam 74, and a fourth seam 76. The third seam 74 and the fourth seam 76 extend along the longitudinal direction of the storage container 30, and extend from the first end 54 of the first storage bag 38 toward the second end 56 of the first storage bag 38, and terminate at the open ends of the first compartment 58 and the second compartment 60 of the first storage bag 38.

The first seam 70 is positioned at the first lateral edge 66 of the storage container 30 and passes through the first panel 50 and the second panel 52 of the first storage bag 38, as well as through one or more panels of the second storage bag 40. The second seam 72 passes through the first panel 50 of the first storage bag 38, as well as through one or more panels of the second storage bag 40. The third seam 74 passes through the first panel 50 and the second panel 52 of the first storage bag 38 adjacent to a terminal edge 78 of the second panel 52. The fourth seam 76 passes through the first panel 50 and the second panel 52 at a location that is disposed between the first seam 70 and the third seam 74.

The first compartment 60 is defined between the first panel 50 and the second panel 52 between the first seam 70 and the fourth seam 76. The second compartment 60 is defined by the first panel 50 and the second panel 52 between the third seam 74 and the fourth seam 76. A bridge panel portion 78 is defined solely by the first panel 50 and extends between the second seam 72 and the third seam 74, from the second lateral edge 68 of the storage bag 30 to the second compartment 60 of the first storage bag 38.

The second storage bag 40 extends from a first end 80 to a second end 82. The second storage bag 40 could be defined by one or more panels that are fixed to one another. For example, the first storage bag 40 could be defined by a first panel 86 and a second panel 88.

The second storage bag 40 defines a third compartment 90. The third compartment 90 is defined at least partially by the third panel 86 and the fourth panel 88 in cooperation with one another. The third compartment 90 has an open end that is positioned adjacent to the first end 80 of the second storage bag 40. The second storage bag 40 could include a flap 92 that is moveable between open and closed positions with respect to the open end of the third compartment 90. The flap 92 could be defined by part of either of the third panel 86 or the fourth panel 88. A hook-and-loop fastener 94 is provided to secure the flap 92 in a closed position.

The third panel 86 and the fourth panel 88 are connected to one another. The third panel 86 and the fourth panel 88 could be permanently affixed to one another. For example, the third panel 86 and the fourth panel 88 could be sewn together at the first seam 70 and the second seam 72. Thus, the first seam 70 could extend through the third and fourth panels 86, 88 of the second storage bag 40, as well as through one or more panels of the first storage bag 38. Likewise, the second seam 72 could extend through the third and fourth panels 86, 88 of the second storage bag 40, as well as through one or more panels of the first storage bag 38.

The first wheel chock 48A and the second wheel chock 48B are received within the third compartment 90. A moveable barrier in the form of a divider flap 96 is fixed to an interior surface of the second storage bag 40. For example, the divider flap 96 could be fixed to the third panel 86 of the second storage bag 40 by a seam 98. The divider flap 96 is positionable between the first wheel chock 48A and the second wheel chock 48B to prevent the first wheel chock 48A and the second wheel chock 48B from directly contacting one another. By preventing direct contact between the first wheel chock 48A and the second wheel chock 48B, the divider flap 96 minimizes or eliminates rattle noise emanating from the first wheel chock 48A and the second wheel chock 48B during operation of the vehicle.

The second panel 52 of the first storage bag 38 has an exterior surface 100 and the third panel 86 of the second storage bag 40 has an exterior surface 102. In the area between the first and second lateral edges 66, 68 of the storage container 30, as well as between the first seam 70 and the second seam 72, the exterior surface 100 of the first storage bag 38 is in contact with the exterior surface 102 of the second storage bag 40.

The storage container 30 includes a first retainer strap 104 and a second retainer strap 106. The first and second retainer straps 104, 106 are each fixed to one of the first storage bag 38 or the second storage bag 40, and in the illustrated embodiment are fixed to the first storage bag 38 by seams 108. The first retainer strap 104 and the second retainer strap 106 each extend around both the first storage bag 38 and the second storage bag 40 to secure the first storage bag 38 with respect to the second storage bag 40.

The first retainer strap 104 is positioned in alignment with the first wheel chock 48A. The second retainer strap 106 is positioned in alignment with the second wheel chock 48B. The first retainer strap is engageable with the second storage bag 40 adjacent to the first wheel chock 48A. The second retainer strap 106 is engageable with the second storage bag 40 adjacent to the second wheel chock 48B.

The first retainer strap 104 and the second retainer strap 106 each include a tensioning structure, such as a first tensioning structure 110 of the first retainer strap 104 and a second tensioning structure 112 of the second retainer strap 106. The first and second tensioning structures 110, 112 are operable to tighten and release the first and second retainer straps 104, 106, respectively. The first and second tensioning structures 110, 112 could be in the form of two-part strap buckles that allow the first and second retainer straps 104, 106 to be tensioned as well as released by separation of the parts of the two-part strap buckles.

By provision of the first retainer strap 104 and the second retainer strap 106, the second storage bag 40 can be secured with respect to the first storage bag 38. This prevents motion of the wheel chocks 48A, 48B with respect to the jack tools 46A-46D. This also reduces the stress imposed upon the first seam 70 and the second seam 72 in response to dynamic loading experienced by the storage container 30.

Figure 6:
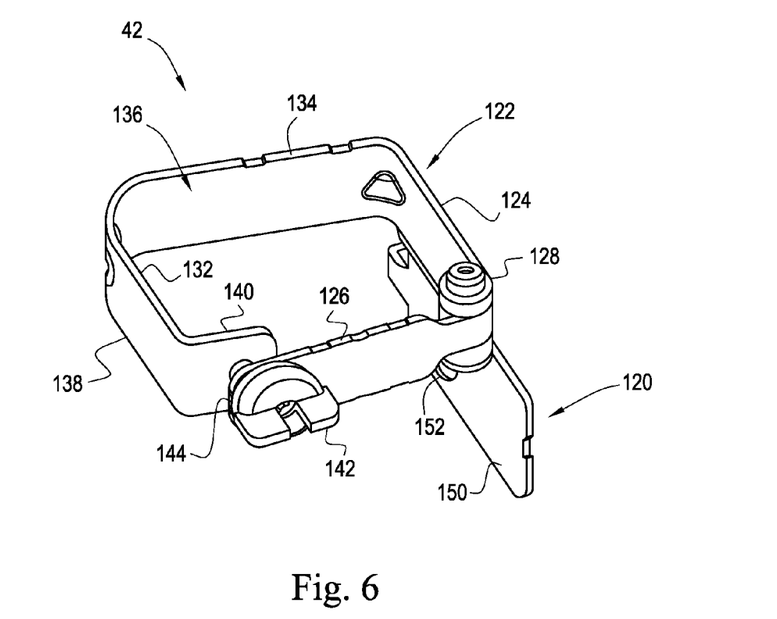
FIG. 6 is a perspective view showing an upper bracket of the tool mounting assembly.
Figure 7:
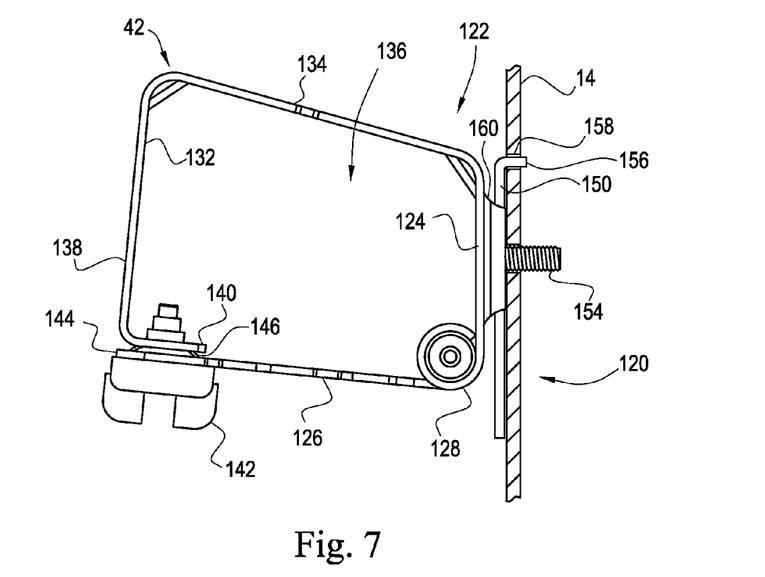
FIG. 7 is a top view showing the upper bracket attached to a rearmost structural pillar of the motor vehicle.
Figure 8:
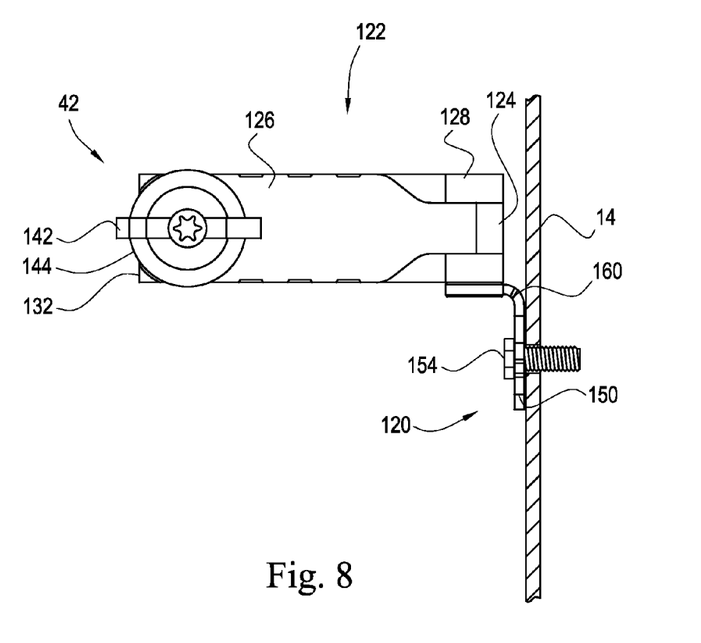
FIG. 8 is a side view showing the upper bracket attached to a rearmost structural pillar of the motor vehicle.

The upper bracket 42 and the lower bracket 44 can be substantially identical in construction and will be described with reference to the upper bracket 42. As shown in FIGS. 6-8, the upper bracket 42 includes a mounting portion 120 and a retaining portion 122. When assembled, the retaining portion 122 of the upper bracket 42 at least partially surrounds the upper portion 32 of the storage container 30, and may fully surround the upper portion 32 of the storage container 30. When assembled, the retaining portion 122 of the lower bracket 44 at least partially surrounds the lower portion 34 of the storage container 30, and may fully surround the lower portion 34 of the storage container 30. Additionally, either or both of the upper bracket 42 and the lower bracket 44 could fully surround the storage container 30 in a direction that is substantially perpendicular to a longitudinal direction of the first storage bag 38 of the storage container 30. The mounting portions 120 of the upper bracket 42 and the lower bracket 44 are, when assembled, attached to the vehicle body structure 12.

The retaining portions 122 of the upper and lower brackets 42, 44 each include a base flange 124 that is connected to a first arm 126 by a hinge 128. The first arm 126 pivots with respect to the base flange 124 between a closed position and an open position. The first arm 126 could pivot with respect to the base flange 124 in a plane that is substantially perpendicular to the bracket axis 130 (FIG. 2) that is defined between the upper bracket 42 and the lower bracket 44.

The retaining portion 122 of each of the upper bracket 42 and the lower bracket 44 also includes a second arm 132 and a third arm 134. The second arm 132 is opposite the base flange 124, and is spaced from the base flange 124 by the third arm 134. In combination, the base flange 124, the first arm 126, the second arm 132, and the third arm 134 may define a closed cross-sectional shape for the retaining portion 122 of each of the upper bracket 42 and the lower bracket 44. For example, the base flange 124 and the first through third arms 126, 132, 134 could define a closed polygon, such as a trapezoid. Thus, the retaining portion 122 defines an opening 136 that is surrounded by the base flange 124, the first arm 126, the second arm 132, and the third arm 134. The opening 136 is configured to receive a portion of the first storage bag 38, such as the upper portion 32 of the storage container 30 or the lower portion 34 of the storage container 30, each of which are defined by the first storage bag 38.

The second arm 132 of the retaining portion 122 of each of the upper bracket 42 and the lower bracket 44 includes a main portion 138 that extends outward from the third arm 134 and an attachment portion 140 that is opposite the third arm 134 and extends at an angle with respect to the main portion 138 of the second arm 132. When the upper or lower bracket 42, 44 is in its closed position, the attachment portion 140 of the second arm 132 and the first arm 126 are in a substantially coplanar relationship and are positioned adjacent to one another.

To connect the first arm 126 to the attachment portion 140 of the second arm 132, a fastener 142 is provided at an outboard end of the first arm 126, opposite the hinge 128. For example, the fastener 142 could be a bolt having a head and a threaded shaft or any other suitable fastener. The fastener 142 extends through an aperture that is formed through the first arm 126 and is retained on the first arm 126 by a retainer member 146 that resists removal of the fastener 142 from the first arm 126 when the respective one of the upper bracket 42 or the lower bracket 44 is in the open position to positively retain the fastener 142 on the first arm 126. The second arm 132 defines a threaded aperture 148 that is formed through the attachment portion 140 of the second arm 132. The second arm 132 also defines extruded threads that are formed on the periphery of the threaded aperture 148 and are threadedly engageable with the fastener 142 of the first arm 126 in order to secure the first arm 126 with respect to the second arm 132 in the closed position.

The mounting portion 120 includes a mounting surface 150 having a fastener aperture 152 formed therethrough. A fastener 154 is receivable in the fastener aperture 152 and is engageable with the rearmost structural pillar 14 or other portion of the vehicle body structure 12 in order to secure each of the upper bracket 42 and the lower bracket 44 with respect to the vehicle body structure 12.

A flange 156 extends outward from the mounting surface 150 and may extend substantially perpendicular to the mounting surface 150. The flange 156 is received within an aperture 158 that is defined by a portion of the vehicle body structure 12, such as the rearmost structural pillar 14. Engagement of the flange 154 with the rearmost structural pillar 14 in the aperture 158 aids positioning and alignment of each of the upper bracket 42 and the lower bracket 44 during assembly, and restrains rotation of each of the upper bracket 42 and the lower bracket 44 with respect to the rearmost structural pillar 14 of the vehicle.

The mounting portion 120 includes an offset bend 160 that connects the mounting surface 150 to the base flange 124 of the retaining portion 122. The offset bend 160 may extend through a radius of approximately 90° and interconnects the mounting portion 120 and the retaining portion 122 such that the base flange 124 and the mounting surface 150 extend substantially parallel with respect to one another but are offset with respect to one another. Thus, the base flange 124 could extend substantially parallel to the rearmost structural pillar 14 of the vehicle, but at the same time be spaced apart therefrom.

Although the structure described above is suitable for both the upper bracket 42 and the lower bracket 44, it should be understood that the upper and lower brackets 42, 44 could, alternatively, be any suitable attachment mechanism now known or later developed that is configured to fully or partially surround either of the upper portion 32 or the lower portion 34 of the storage container 30. For example, the upper bracket 42 and the lower bracket 44 could be either rigid or flexible; the upper bracket 42 and the lower bracket 44 could be either hinged or unhinged; and the upper bracket 42 and the lower bracket 44 could each be either of a one-piece structure or a multiple piece structure.

In use, the upper bracket 42 and the lower bracket 44 are installed with respect to the rearmost structural pillar 14 of the vehicle. The upper and lower brackets 42, 44 are moved to their opened positions, and the storage container 30 is received within the openings 136 of the upper bracket 42 and the lower bracket 44 such that the central portion 36 of the storage container 30 is disposed between the upper bracket 42 and the lower bracket 44. The upper and lower brackets 42, 44 are moved to their closed positions, and the storage container is secured by the upper bracket 42 and the lower bracket 44. If the upper and lower brackets 42, 44 are again moved to their opened positions, the storage container 30 is then removable from the upper bracket 42 and the lower bracket 44.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tool mounting assembly for a motor vehicle, comprising:
    a vehicle body structure;
    a first storage container portion that is configured to receive at least one jack operation tool;
    a second storage container portion that is fixed to the first storage container portion and is configured to receive at least one wheel chock;
    a first bracket that is attached to the vehicle body structure and fully surrounds the first storage container portion in a direction that is substantially perpendicular to a longitudinal direction of the first storage container portion; and
    a second bracket that is attached to the vehicle body structure and at least partially surrounds the first storage container portion, wherein the second storage container portion is positioned between the first bracket and the second bracket.

2. The tool mounting assembly of claim 1, wherein a circumference of the first bracket corresponds to a circumference of the first storage container portion and a circumference of the second bracket corresponds to the circumference of the first storage container portion.

3. The tool mounting assembly of claim 1, further comprising a barrier positioned between the first storage container portion and the second storage container portion that prevents the at least one jack operation tool and the at least one wheel chock from directly contacting one another.

4. The tool mounting assembly of claim 1, wherein the at least one wheel chock includes at least a first wheel chock and a second wheel chock, the second storage container portion is configured to receive the first wheel chock and the second wheel chock, and a moveable barrier is fixed to an interior surface of the second storage container portion and is positionable between the first wheel chock and the second wheel chock to prevent the first wheel chock and the second wheel chock from directly contacting one another.

5. The tool mounting assembly of claim 1, wherein the first storage container portion and the second storage container portion each comprise a flexible material.

6. The tool mounting assembly of claim 5, wherein the first storage container portion and the second storage container portion are sewn together.

7. The tool mounting assembly of claim 5, wherein the at least one jack operation tool is received within a first compartment that is defined by one or more panels of the first storage container portion, the at least one wheel chock is received within a second compartment that is defined by one or more panels of the second storage container portion, and the one or more panels that define the first compartment are independent of the one or more panels that define the second compartment.

8. The tool mounting assembly of claim 5, wherein the first storage container portion is connected to the second storage container portion such that a first exterior surface of the first storage container portion is in contact with a second exterior surface of the second storage container portion.

9. The tool mounting assembly of claim 8, wherein the first storage container portion is connected to the second storage container portion by a first seam that extends along a first lateral edge of the second storage container portion and a second seam that extends along a second lateral edge of the second storage container portion that is opposite the first lateral edge, and at least a portion of the second exterior surface of the second storage container portion is defined between the first lateral edge and the second lateral edge of the second storage container portion.

10. The tool mounting assembly of claim 9, further comprising:
a bridge panel that extends outward with respect to a third seam that at least partially defines a first compartment of the first storage container portion and is connected to the second seam at the second lateral edge of the second storage container portion.

11. The tool mounting assembly of claim 5, wherein at least one of the first storage container portion or the second storage container portion includes a lid flap that is secured by hook-and-loop fasteners.

12. The tool mounting assembly of claim 1, wherein the first storage container portion extends from a first end to a second end in a longitudinal direction, and the second storage container portion is fixed to the first storage container portion such that it is spaced apart from both the first end and the second end of the first storage container portion.

13. The tool mounting assembly of claim 1, further comprising:
a first retainer strap that is fixed to one of the first storage container portion or the second storage container portion and extends around both the first storage container portion and the second storage container portion to secure the first storage container portion with respect to the second storage container portion.

14. The tool mounting assembly of claim 13, further comprising:
a second retainer strap that is fixed to one of the first storage container portion or the second storage container portion and extends around both the first storage container portion and the second storage container portion to secure the first storage container portion with respect to the second storage container portion, wherein the at least one wheel chock includes at least first and second wheel chocks, the first retainer strap contacts the second storage container portion adjacent to the first wheel chock and the second retainer strap contacts the second storage container portion adjacent to the second wheel chock.

15. A tool mounting assembly for a motor vehicle, comprising:
a vehicle body structure;
a first storage bag that is configured to receive at least one jack operation tool;
a second storage bag that is fixed to the first storage bag and is configured to receive a first wheel chock and a second wheel chock, wherein the first storage bag extends from a first end to a second end in a longitudinal direction, and the second storage bag is fixed to the first storage bag such that it is spaced apart from both the first end and the second end of the first storage bag;
an upper bracket that is attached to the vehicle body structure and at least partially surrounds the first storage bag, wherein a circumference of the upper bracket corresponds to a circumference of the first storage bag; and
a lower bracket that is attached to the vehicle body structure and at least partially surrounds the first storage bag, wherein a circumference of the lower bracket corresponds to the circumference of the second first storage bag, and the second storage bag is positioned between the upper bracket and the lower bracket.

16. The tool mounting assembly of claim 15, wherein the first storage bag and the second storage bag each comprise a flexible material.

17. The tool mounting assembly of claim 15, further comprising a barrier positioned between the first storage bag and the second storage bag that prevents the at least one jack operation tool from directly contacting either of the first wheel chock or the second wheel chock.

18. The tool mounting assembly of claim 15, wherein a moveable barrier is fixed to an interior surface of the second storage bag and is positionable between the first wheel chock and the second wheel chock to prevent the first wheel chock and the second wheel chock from directly contacting one another.

19. The tool mounting assembly of claim 15, wherein the first storage bag is connected to the second storage bag such that a first exterior surface of the first storage bag is in contact with a second exterior surface of the second storage bag, the first storage bag is connected to the second storage bag by a first seam that extends along a first lateral edge of the second storage bag and a second seam that extends along a second lateral edge of the second storage bag that is opposite the first lateral edge, and at least a portion of the second exterior surface of the second storage bag is defined between the first lateral edge and the second lateral edge of the second storage bag.

20. The tool mounting assembly of claim 15, further comprising:
a first retainer strap that is fixed to one of the first storage bag or the second storage bag and extends around both the first storage bag and the second storage bag to secure the first storage bag with respect to the second storage bag; and
a second retainer strap that is fixed to one of the first storage bag or the second storage bag and extends around both the first storage bag and the second storage bag to secure the first storage bag with respect to the second storage bag, wherein the first retainer strap contacts the second storage bag adjacent to the first wheel chock and the second retainer strap contacts the second storage bag adjacent to the second wheel chock.

* * * * *